United States Patent [19]

Kam et al.

[11] Patent Number: 5,113,393
[45] Date of Patent: May 12, 1992

[54] APPARATUS FOR DISTRIBUTING DATA PROCESSING

[75] Inventors: John Kam, Concord; Lee M. Truchon, Andover; Thomas C. Goodale, Reading; John T. Dalton, Chelmsford, all of Mass.

[73] Assignee: Wang Laboratories, Inc., Lowell, Mass.

[21] Appl. No.: 504,145

[22] Filed: Apr. 3, 1990

Related U.S. Application Data

[63] Continuation-in-part of Ser. No. 944,500, Dec. 19, 1986, Pat. No. 4,932,026.

[51] Int. Cl.$^5$ .............................................. H04J 3/24
[52] U.S. Cl. .................................................. 370/94.1
[58] Field of Search ................... 370/94.1, 94.2, 94.3, 370/60, 60.1, 85.1

[56] References Cited

U.S. PATENT DOCUMENTS 4,503,499  3/1985  Mason et al.
4,679,189  7/1987  Olson et al. ........................ 370/94.1
4,750,109  6/1988  Kita .................................... 370/94.1

OTHER PUBLICATIONS

*Which Computer*, Mar. 1986, "Staffware".
*Software Review*, "Corporate Computing Catches Up With PCs", Kevin Townsend–Reprint from Computer Weekly, Feb. 13, 1986.
*Seybold Report*, vol. 8, No. 6, Jun. 3, 1985, "Routine Automation".
*Fortune*, Jun. 8, 1987, "Software Catches the Team Spirit" by Louis S. Richman, p. 125.
"Logical Routing Specification in Office Information Systems" by Murray S. Mazer and Frederick H. Lockovsky in *ACM Transactions in Office Information Systems*, vol. 2, No. 4, Oct. 1984, pp. 303-330.
"An Active Mail System" by John Hogg, *Stelios Gamvroulas Sigmod '84 Proceedings*, Boston 1984.

*Primary Examiner*—Douglas W. Olms
*Assistant Examiner*—Wellington Chin
*Attorney, Agent, or Firm*—Michael H. Shanahan

[57] ABSTRACT

Computer apparatus provides distribution of processing among a plurality of loci of control. Specific loci of control include an origination point, an entry point to a recipient's mailbox, in a recipient's mailbox, an exit point from a recipient's mailbox and a completion point after a last recipient. Processing is performed in a foreground or background task, and interactively or non-interactively at each desired loci of control. Processing includes invocation of an application automatically upon receipt of subject data at a focus of control or upon manual command by the recipient at the locus of control. Pre-existing applications are invoked through a common interface between the present invention apparatus and pre-existing applications. A data update routine records recipient's modification of the data during recipient editing in multiple sessions at a locus. A recovery routine insures that at most the last editing session is lost in a system crash. Files included in the subject data may be specified by preprogramming to be viewable or hidden to recipients.

18 Claims, 9 Drawing Sheets

APPARATUS FOR DISTRIBUTING DATA PROCESSING

Related Applications

The following is a Continuation-in-Part of U.S. patent application Ser. No. 944,500 for "APPARATUS FOR DISTRIBUTING DATA PROCESSING ACROSS A PLURALITY OF LOCI OF CONTROL" filed Dec. 19, 1986, now U.S. Pat. No. 4,932,026 and assigned to the assignee of the present invention. That application is herein incorporated by reference.

BACKGROUND OF THE INVENTION

Many prior art computer systems have a plurality of loci of control, i.e., there is more than one entity in the computer system which may execute a program. The relationship between the loci of control and the system hardware varies from system to system. In some systems, a locus of control corresponds directly to a portion of a physical system. For example, in a distributed system connected by a network, each locus may be a node in the network. In others, the locus of control may be a task, and one or more CPUs in a system may be multiplexed among a plurality of tasks.

Systems having a plurality of loci of control permit distributed data processing, i.e., data processing involving more than one locus of control. For example, a corporation may have a computer system consisting of a network with nodes at various branch offices, at regional offices, and the head office. The processing of expense reports for the corporation may involve processing in the branch offices, further processing at the regional offices, and still further processing at the head office.

The advantages of distributed data processing are obvious. It corresponds more closely to normal business procedures than centralized processing, the turnaround time at each stage is quicker, and the fact that processing is carried on at many loci of control reduces the effect of the failure of any one of the loci. The use of distributed data processing has, however, been limited by the difficulties involved in programming for more than one locus. In programming for a single locus, a programmer need concern himself only with the sequence of operations to be performed; in programming for a plurality of loci, the programmer must write code for each of the loci and further specify communications between the loci. Even where the loci are tasks executing on a single system, the need to specify communications requires knowledge of the operating system not typically found among applications programmers. Where the loci are nodes in a network, the communications problem is more difficult. Moreover, in many cases, the nodes will have different kinds of processors, and consequently, writing a distributed application requires either a programmer who understands all of the processors or a group of programmers. Programmers of the former type are rare and expensive, and communication among a group of programmers is difficult, particularly when the programmers are programming different machines and may further be geographically dispersed.

Prior art solutions to distributed processing have included systems in which processing is distributed among the loci but remains under central control and systems in which processing is under local control. An example of the first type of system is the active mail system described in "An Active Mail System" by John Hogg and Stelios Gamvroulas, *SIGMOD* 1984 *Proceedings,* Boston, Pages 215-222, 1984.

The system described in the reference is an active mail system for processing messages. The messages are not merely passive text which is sent to recipients. Instead, a message is active and can perform functions such as receiving information from the recipient and providing it to the sender or using the information from the recipient to determine who the next recipient should be and directing itself to the next recipient. As may be seen at Page 218 of the above reference, the embodiment of active mail described therein is implemented by means of a single central post office process which controls the messages at every point.

A commercial product which appears to embody the principles described in the above reference is Staffware, manufactured by FCMC, Inc., 2750 S. Wadsworth Blvd., Denver, Colo. 80227. Staffware is described in the following publications: Staffware Brochure and Demonstration Disk, FCMC, Inc., Denver, May 1985; "Routine Automation", *The Seybold Report on Office Systems*, Volume 8, No. 6, Page 18, Jun. 3, 1985; Kevin Townsend, "Corporate Computing Catches Up with PCs", *Computer Weekly*, Feb. 13, 1986; and "Staffware", *Which Computer?*, March 1986.

As described in the above publications, Staffware is a centralized system for automating business procedures where processing takes place at one or more locations accessible to the centralized system. Another product which appears to embody the same principles is the Workflo component of the Filenet document image processing system, manufactured by Filenet Corp., Costa Mesa, Cal.

An example of a system in which the distributed processing operates under local control is the office information routing system described in: Murray S. Mazer, Frederick H. Lochovsky, "Logical Routing Specification in Office Information Systems", *ACM Transactions on Office Information Systems*, Vol. 2. No. 4, October 1984, Page 303-330. In that system, users define a routing specification for a type of message, for example a form for deciding whether a candidate is to be admitted to a Ph.D. program. The routine specification describes how the message is to be routed among the loci, and can vary the routing depending on the values of fields in the message. Once the routing specification is finished, the portion of the specification relevant to a given locus is sent to that locus. When a message of the type corresponding to the routing specification arrives in the locus, it is processed as specified in that locus's portion of the routing specification. The system also provides for override routing, in which the routing specification is edited for a given message, the altered specification is provided to the message, and further routing is as specified in the altered specification. The routing specification does not specify processing beyond routing.

A problem shared by both the centralized and distributed prior art systems is that the actual routing is done centrally. In the case of the active message systems, the recipient of the message cannot alter the processing of the message to suit his situation, and in the case of the Mazer-Lochovsky system, the route specification is centrally defined and alterations may be made only by means of the override specification. The person making the override specification must have a copy of the route specification and must further know where the message presently is (Mazer and Lochovsky, pp. 308-309). Overrides are consequently expensive and cannot be normal responses to the various situations encountered in the course of business procedures, but must be reserved for truly exceptional situations.

Centrally-produced routing which is difficult to alter is further not well suited to business procedures. Definition of many business procedures is hierarchical, i.e., an upper level of management gives an overall definition of the procedure and management in the departments which actually carry out the procedure fill in the details. Moreover, each business transaction is in fact unique, and consequently, a distributed data processing system used for business transactions will be useful only if it is easy to modify the manner in which a specific transaction is dealt with.

A further problem shared by the prior art systems is that the message systems are limited to a single data type, namely the message, whereas many business procedures require information having a number of different types. For example, a business ordering transaction may involve an image of the customer letter which initiated the transfer, internal memos discussing the order, and a "form" (implemented by means of a spread sheet) for recording the data associated with the transaction. A truly useful system must not only provide data of such different types to the user, but must also make it easy for him to work with each type of data in the manner required by the type.

A further limitation of the prior-art systems, finally, is that they are limited to interactive processing, i.e., they can present a message to a user for processing, but cannot apply the general resources of the locus to the message. Because this is the case, the prior-art systems cannot be used for general distributed data processing A problem of the prior-art systems in which the distributed processing is centrally controlled is the large amount of communication required between the central control and the loci where the remote processing is being done. Because of the large amount of communication, performance of such systems becomes unacceptable when the loci are connected by a wide-area network.

A problem specific to the distribution systems, finally, is the tracking and control of the data as it is processed on the different loci. These, and other problems of the prior art are solved by the invention described herein

SUMMARY OF THE INVENTION

The apparatus for distributing the processing of data across a plurality of loci of control of the present invention includes a package which contains the data to be processed and a processing descriptor which is associated with the data and specifies how the data is to be processed in more than one of the loci, a message system for providing the package to the loci, and an interpreter in each locus specified in the processing descriptor which processes the data as specified for that locus in the processing descriptor. Processing may be interactive or by means of program execution, with subsequent routine being dependent on the result of the processing.

In other aspects of the invention, the processing descriptor specifies the package type. The message system routes the package to loci according to the specified package type, and the interpreters process the data according to the package type.

In a preferred embodiment of the present invention, the message system involves an electronic mail system. The loci for processing the data may include an origination point, entrance to a recipient electronic mailbox, within a recipient electronic mailbox, an exit from a recipient electronic mailbox, and/or a final processing point after all other loci for processing the data. Also, control means are employed at each locus to provide automatic triggering of processing at a locus as indicated by the processing descriptor upon receipt of the package at the locus. Thus, processing is initiated without a command given to the locus subsequent to arrival of the package.

In another aspect of the present invention, each interpreter includes an interface for calling a pre-existing application such that package data is processed within that application. The control means coupled with the interface enables invocation of a pre-existing application upon recipient selection of the package from an electronic mailbox to which the package has been passed.

The processing descriptor may include indications of viewability of each piece of data in the package. To that end, certain data is viewable and other data is hidden to a user of each locus.

The present invention further provides editing means in each locus for editing package data in a multiplicity of sessions. This is accomplished preferably by data update means in each locus which updates data of the package during editing of the data in each session instead of upon completion of processing at the locus.

It is thus an object of the invention to provide an improved digital data processing system;

It is another object of the invention to provide an improved digital data processing system of the type wherein processing is performed by a plurality of loci of control;

It is a further object of the invention to provide improved apparatus for distributing processing of data across a plurality of loci of control;

It is an additional object of the invention to provide apparatus which simplifies programming of distributed processing of data by a plurality of loci of control.

Other objects and advantages of the present invention will be understood by those of ordinary skill in the art after referring to the detailed description of a preferred embodiment contained herein and to the drawings, wherein:

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF A PREFERRED EMBODIMENT

For convenience and clarity, pertinent sections from the parent U.S. patent application Ser. No. 944,500 are repeated hereafter and are followed by a detailed description of a preferred embodiment of the present invention.

Figure 1:
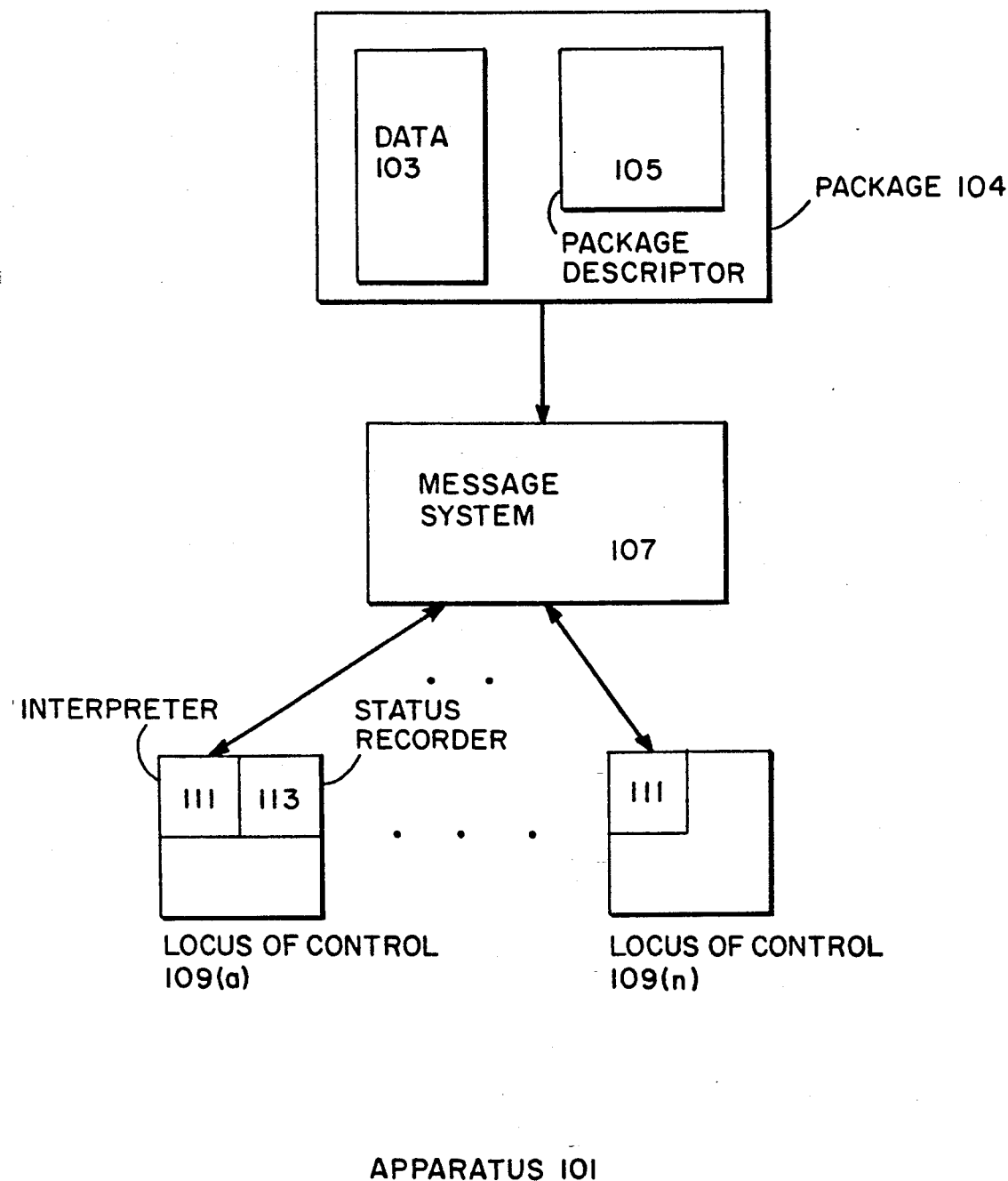
FIG. 1 is a logical overview of Apparatus 101 for distributing data processing.

1. Logical Overview of the Apparatus for Distributing Data: FIG. 1

FIG. 1 is a logical block diagram of the apparatus of interest for distributing data. The apparatus is employed in a system including a plurality of loci of control (LC) 109(a..n) and a message system (MS) 107 for transferring data between the loci of control. The LCs 109 may be individual hardware processors in a multi-processor system, nodes in a network, tasks in a multi-programming system, or some combination of the above. If the LCs 109 are tasks, MS 107 may be an inter-task communication system; if they are processors in a multi-processor system, it may be a system for communicating between the processors; if they are nodes in a network, MS 107 may be the network. Again, combinations are possible. For example, if the LCs 109 are tasks running on nodes in the network, MS 107 may be inter-task messages which are sent via the network.

The data to be processed in LCs 109 and the instructions for processing it are contained in package (PKG) 104. Data 103 may be in any form in which data may be transferred via MS 107. In many cases, data 103 will be a file or a set of several files. The instructions as to how data 103 is to be processed in the various LCs 109 are contained in processing descriptor (PD) 105. PD 105 may also be in any form in which data may be transferred via MS 107, and will in many cases be a file or a code name of a file. The instructions indicate at least the sequence of steps to be executed in each LC 109, the maximum time intervals between the steps, and the actions to be taken when exception conditions occur. Additionally, execution of certain of the instructions may be dependent on values in data 103 and the instructions may further indicate which user of the system is responsible for data 103, so that information concerning the status of the processing may be returned to him.

Each LC 109 includes an interpreter (INT) 111 which reads PD 105 and causes LC 109 to carry out the instructions for that LC 109 contained in PD 105. If further processing at another LC 109 is required, INT 111 uses MS 107 to send package 104 to that LC 109. As LC 109 carries out the instructions, it may also report the status of the processing on that LC 109 by sending status messages via MS 107 concerning the status to another LC 109 specified in PD 105. The specified LC 109, shown in FIG. 1 as LC 109(a), further includes status recorder (SR) 113, which receives the status messages and records them for examination by the person controlling the process specified in PD 105.

Figure 2:
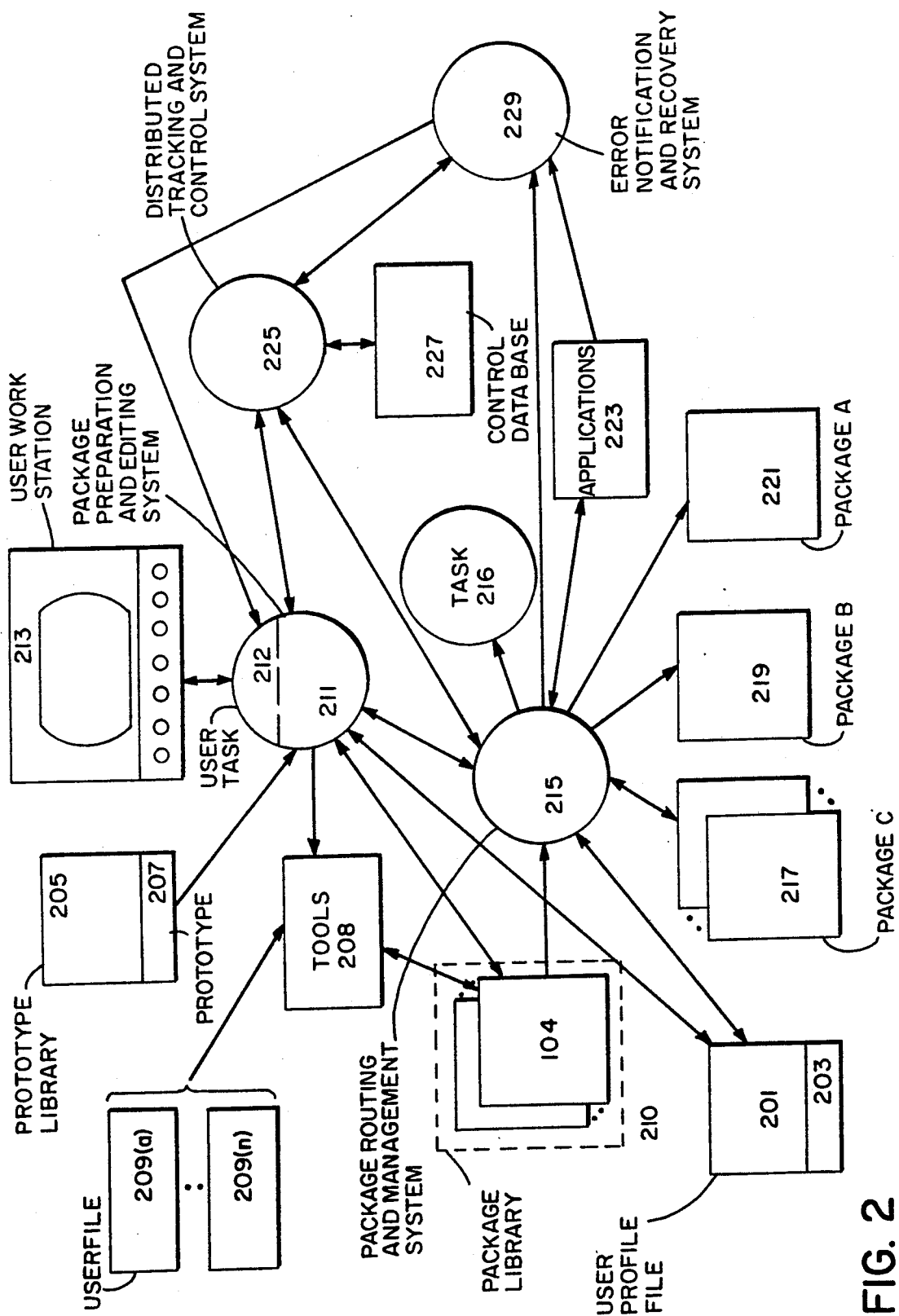
FIG. 2 is a block diagram of a preferred embodiment of apparatus 101.

2. Overview of a First Preferred Embodiment of Apparatus 101: FIG. 2

FIG. 2 is an overview of a preferred embodiment of apparatus 101. The embodiment is designed for use in a computer system wherein individual LCs 109 have electronic mailboxes for sending and receiving messages via an electronic mail system. An example of such a system is VS multitasking processors manufactured by Wang Laboratories, Inc. which are connected by Wangnet and communicate by means of the mail component of Wang Office. In FIG. 2, square indicate data structures, circles indicate tasks, and UWS 213 indicates a user work station with CRT and keyboard. Arrows indicate the flow of information between the components of the apparatus.

Beginning with the processing components, package preparation and editing system (PPES) 211 is the general user interface to apparatus 101. PPES 211 runs in user task (UT) 212, which interacts with UWS 213 and sends messages to and receives them from other tasks via the mail system. Using PPES 211, a user can define types of package, create packages 104, modify a package's contents and the way they are processed, and determine status of a package 104. Package routing and management system (PRMS) 215 is a task which executes PD 105 in PKG 104. Distributed Tracking and Control System (DTCS) 225 is a task which keeps track of the current location and status of packages 104 and permits users of apparatus 101 to control processing asynchronously by means of control commands. Error notification and recovery system (ENRS) 229, finally, is a task which notifies users of the system of errors and carries out recovery procedures. PRMS 215, DTCS 225, and ENRS 229 will be accessible to any LC 109 processing a package 104, and PPES 211 will be accessible to any LC 109 which creates or edits a package 104. Communication between UT 212 and the tasks PRMS 215, DTCS 225, and ENRS 229 is by means of messages sent via the mail system. As may be seen by the above description, PRMS 215, DTCS 225, and ENRS 229 represent an expanded embodiment of INT 111 and SR 113.

Returning to the data structures, PPES 211 constructs PKG 104 in PKGLIB 210, a file system library on LC 109 accessible to PPES 211, PRMS 215, DTCS 225, and ENRS 229. To construct PKG 104, PPES 211 uses prototype library (PTL) 205, programs for manipulating the contents of PKG 104 in TOOLS 208, and user files (UF) 209. PTL 205 contains a set of prototypes (PTYPE) 207. Each PTYPE 207 is a prototype of a certain type of PKG 104. In response to a PTYPE 207, PPES 211 interacts with the user via UWS 213 to obtain the information needed to construct a PKG 104 of the given type. The user may specify entire UFs 209, which PPES 211 then copies into PKG 104 using programs in TOOLS 208 specific to the type of UF 209. The user may also specify data, which PPES 211 may use as specified in PTYPE 207 to create a file in PKG 104, again using programs in TOOLS 208. If a user wishes to manipulate a file in PKG 104, PPES 211 automatically determines the type of the file and provides the user with the programs from TOOLS 208 proper to the kind of file when the user desires to manipulate it. TOOLS 208 may also include programs for assuring consistency among the components of the package type.

PPES 211 constructs PD 105 in PKG 104 from information obtained from PTL 205 and user profile (UPF) 201, which contains information about users of LC 109, and may further obtain information from the user. PPES 211 manipulates PD 105, like the other files, using programs from TOOLS 208. In some cases, the user may simply write his own PD 105, using programs provided by PPES 211 from TOOLS 208.

Once the user has specified a PTYPE 207, provided the information needed to make PD 105, and specified the proper UFs 209, PPES 211 creates PKG 104 containing the PD 105 made from PTYPE 207 and copies of UFs 209. During creation of PKG 104, PPES 211 receives a unique identifier for PKG 104 from DTCS 225. PKG 104 will be the only PKG 104 in apparatus 101 with the identifier and will keep the same identifier until processing is terminated and PKG 104 is destroyed.

When PKG 104 is finished, PPES 211 sends a message to PRMS 215 indicating PKG 104's existence. PRMS 215 then begins executing the steps in PD 105. When a step specifies that PKG 104 be routed to another LC 109, PRMS 215 routes PKG 104 via mail system 107 to that LC 109. After PKG 104 has been sent, it is deleted from PKGLIB 210. In that LC 109, PRMS 215 responds to the arrival of PKG 104 by copying it into PKGLIB 210 in that LC 109. Thereupon, the recipient of PKG 104 may use PPES 211 to manipulate PKG 104 in the manner described with regard to the creation of PKG 104. As a consequence of the editing, steps local to the recipient LC 109 may be added to PD 105 and the local steps may be executed by PRMS 215. PRMS 215 interacts with DTCS 225 to determine whether a PKG 104 is valid and whether there is a control command pending for PKG 104.

In executing steps at an LC 109, PRMS 215 employs user profile file (UPF) 201, tasks 216, and application programs (APPS) 223. If a task 216 or an application program 223 is interactive, it will output data to and receive it from UWS 213. UPF 201 is a file which contains user profile records (UPRs) 203 for all of the users of LC 109 who can receive mail via the mail system. Included in the records is information such as the user's title and current supervisor. Thus, PD 105 may specify those involved in processing a PKG 104 by title or relative position. When PRMS 215 processes PD 105, it uses UPF 201 to resolve titles or relative positions into a user of LC 109. PD 105 may specify either processing directly by PRMS 215 or by a task 216 with which PRMS 215 communicates by means of the mail system. In the first case, PRMS 215 executes a program in APPS 223; in the second case, PRMS 215 sends a message to the task 216 and the task 216 does the processing. Often, the processing involves output of screens of data to UWS 213 and receipt of input from UWS 213. In both cases, of course, the processing may result in alteration of or additions to data 103 in PKG 104.

As its name implies, DTCS 225 has both tracking and control functions. As part of the tracking function, DTCS 225 provides the unique identifier to PKG 104, tracks PKG 104 as it is processed, confirms that a transfer has taken place, maintains CTLDB 227, informs ENRS 229 of any errors it detects, and provides status information on PKG 104 to users of apparatus 101. As part of the control function, DTCS 225 receives control commands from users, sends them to LC 109 at which PKG 204 is currently being processed, and it provides the received control commands to PRMS 215 for execution. PRMS 215 checks with DTCS 225 for control commands on arrival of PKG 104 in LC 109 and before sending PKG 104 to the next LC 109. In the first case, PRMS 215 executes the control commands before performing any other processing in LC 109 and in the second case, it executes the control commands before sending PKG 104 to the next LC 109. PRMS 215 may also check for control commands after a time interval specified in a control command or in PD 105.

Information concerning the location and status of PKG 104 is contained in control data base (CTLDB) 227. There is a local CTLDB 227 in each LC 109; in addition, in a preferred embodiment, groups of LCs 109 may maintain a group CTLDB 227 and the entire system may have a central CTLDB 227. The group and central CTLDBs 227 consolidate information from the local CTLDBs 227. DTCS 225 on each LC 109 provides status information to and receives control commands from users via messages to and from UT 212. If PKG 104 is on the local LC 109, the status information is received directly from the local CTLDB 227 and the control commands are provided directly to the local DTCS 225. If PKG 104 is elsewhere, the local DTCS 225 uses the group and central CTLDBs 227 to locate the LC 109 currently processing PKG 104. It then requests status information from or provides control commands to the DTCS 225 on that LC 109. In other embodiments, there may be a single central CTLDB 227 in addition to the local CTLDBs 227.

Error notification and recovery system 229, finally, deals with errors detected by PRMS 215, APPS 223, DTCS 225, or users in the course of processing. Errors include duplicate PKGs 104, corrupted PKGs 104, or lost PKGs 104. When an error is detected, the component of apparatus 101 which detects the error notifies ERNS 229, which in turn indicates to DTCS 225 how the error is to be dealt with. In some case, ERNS 229 can deal with the error without assistance; in others, ERNS 229 requires assistance from a user, which it receives by sending a message to the proper UT 212.

Figure 3:
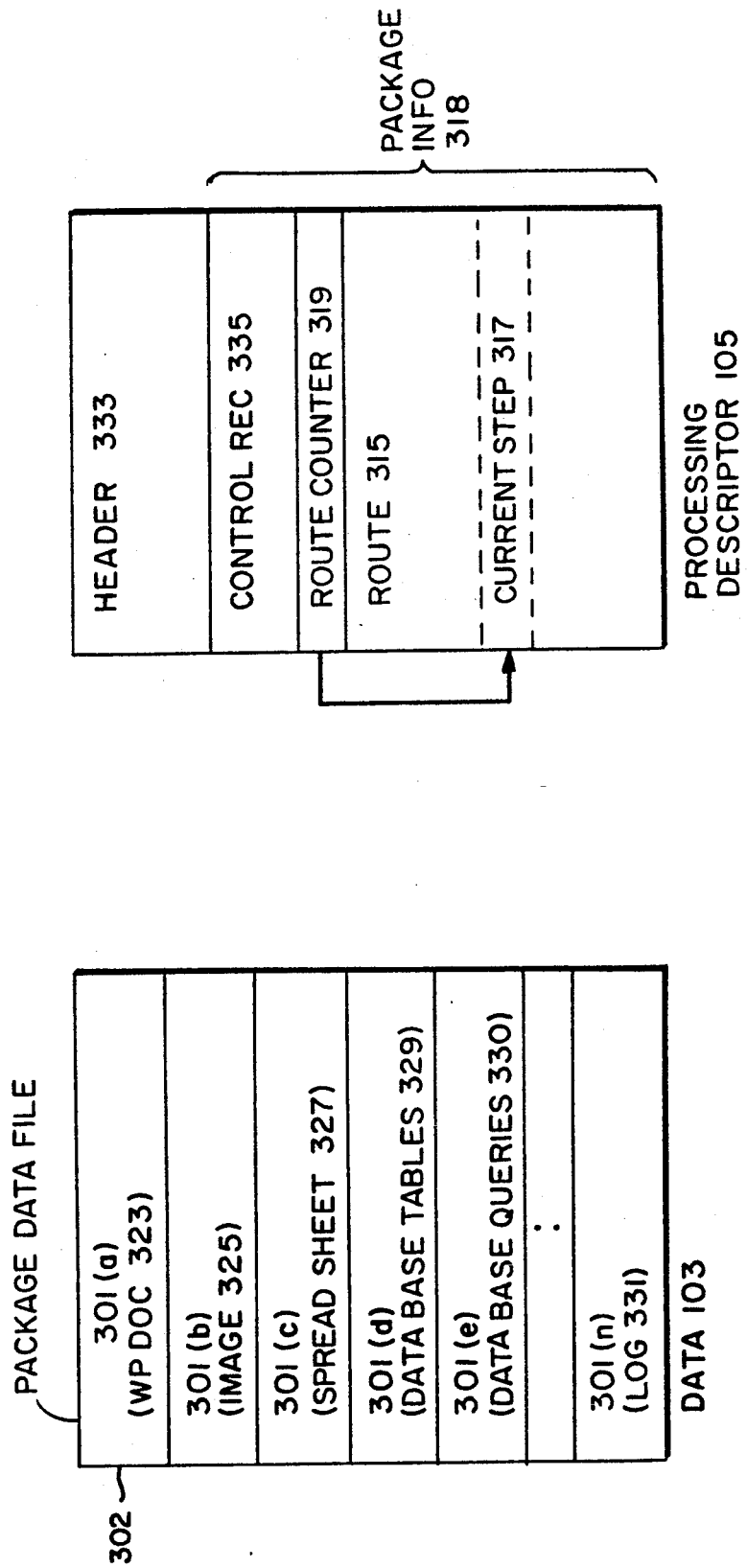
FIG. 3 is a detail of package 104 of apparatus 101.
Figure 3A:
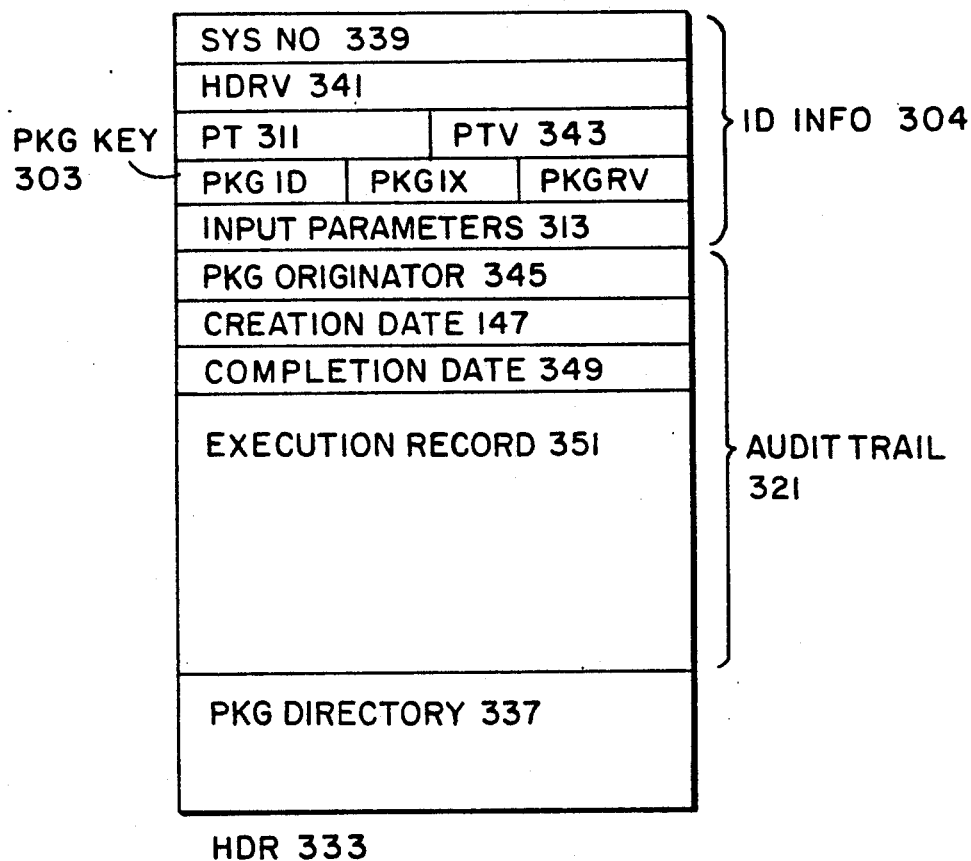
FIG. 3a is a detail of HDR 333 of package 104.
Figure 3B:
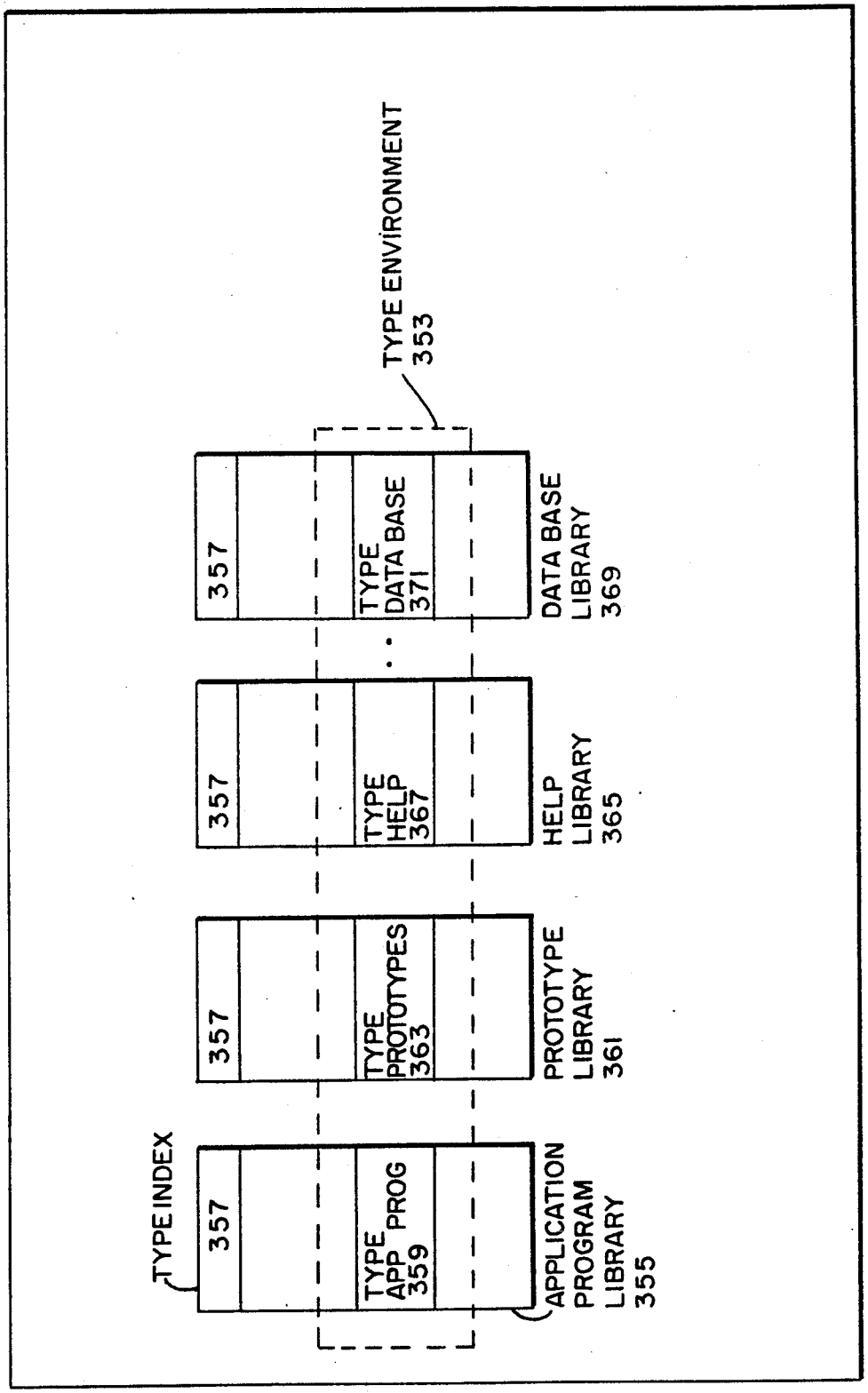
FIG. 3b is a diagram of a type environment in LC 109.

3. Detail of PKG 104: FIGS. 3, 3a and 3b

FIG. 3 is a diagram of PKG 104 in a general embodiment of apparatus 101. PKG 104 has two parts: data 103 and processing descriptor (PD) 105. Beginning with data 103, data 103 consists of package data files (PDF) 301. A PDF 301 may be any kind of file which an LC 109 in the computer system can deal with. Examples of PDFs which might be in a typical PKG 104 include word processing documents (WPDOC 323) images of documents (IMAGE 325), spread sheets (SS327), data base tables (DBTAB 329), and data base queries (DBQ 330). The queries may run on tables in DBTAB 329 or in the LCs 109 which will process PKG 104. A PKG 104 might also include files reserved for use of apparatus 101. One such file is a log file (LOG 331) in which is recorded a list of recipients for PKG 104, their responses to PKG 104, and the times at which the responses were made. Using PPES 211, the current recipient of PKG 104 may view LOG 331 to determine how other recipients responded to PKG 104, and when the current recipient responds, his response is recorded in LOG 331.

As with other files, access to individual PDFs 301 may be controlled. For example, all recipients of a PKG 104 may be permitted to read a certain PDF 301, but only certain recipients may be permitted to alter the PDF 301. Operations are performed on the PDFs 301 in the individual LCs 109 using the tools available in the LCs 109 for dealing with a given type of PDF 301. For example, if the PDF 301 is a WPDOC 323, a recipient who has the proper access may use a word processing editor to edit PDF 301, and if PDF 301 is a DBTAB 329, the recipient may use LC 109's data base system to manipulate DBTAB 329. PDFs 301 are placed in PKG 104 by PPES 211, which copies files specified by a PKG 104's originator or recipients into PKG 104.

Continuing with PD 105, in the preferred embodiments, PD 105 is a file. The file includes the following main components:
  HDR 333, information by which apparatus 101 identifies a specific PKG 104 in the system.
  PINFO 318, information used to determine how PKG 104 is to be processed.

HDR 333 is shown in detain in FIG. 3a. There are three main components: identification information (IDINFO) 304, which contains information by which PKG 104 is identified by apparatus 101, audit trail (AT) 321, which records the processing which PKG 104 has received up the present point, and PDIR 337, which is a directory of the PDFs 301 in PKG 104.

Beginning with IDINFO 304, SYSNO 339 identifies the apparatus 101 in which PKG 104 is being processed; HDRV 341 identifies the version of HDR 333. PT 311 identifies the type of PKG 104. Apparatus 101 uses PT 311 to associate PKG 104 with an environment in LC 109 suitable for the given type of PKG 104. PTV 343 is a type version number. The use of the version number permits users of apparatus 101 to retain a type while making new implementations of it.

The relationship between a package type and an environment is shown in FIG. 3b. When PKG 104 of a given type is processed in LC 109, the processing involves application programs, prototypes, HELP screens, and a data base. The application programs are stored in application program library (APPL) 355, with application programs for a specific package type being stored in TAPPR 359. Type index (TI) 357 permits PRMS 215 in LC 109 to locate TAPPR 359. Similarly, TI 357 in prototype library (PTL) 361 permits location of type prototypes (TPTYP) 363 for the package type, TI 357 in HELP library (HELPL) permits location of THELP files 367 containing information needed by users of LC 109 who are processing PKGs 104 of the type in question, and TI in data base library (DBL) 369 permits location of data bases in LC 109 which are accessed by PKGS 104 of the type, indicated here as TDB 371. TAPPR 359, TPTYP 363, THELP 367, and TDB 371 together make up type environment (TENV) 353.

PKGKEY 303 is the unique identifier by which apparatus 101 identifies PKG 104 from its creation until its destruction. PKGKEY 303 has three components:
  PKGID 305 is the unique identifier provided by DTCS 225 to PPES 211 when PKG 104 was created. All copies and restarts of PKG 104 will have the same PKGID 305.
  PKGIX 307 is PKG 104's index. Each copy of PKG 104 which is made for further processing is distinguished from the original and from other copies by means of its index number in PKGIX 307.
  PKGRV 309 is PKG 104's restart version number. Each time PKG 104 is restarted, the new package receives a different version number in PKGRV 309.

Each of the above numbers is provided by the local DTCS 225 on which PKG 104 is created, split, or restarted. Uniqueness of the numbers is assured by giving each LC 109 an identifier which is unique in the system in which apparatus 101 is implemented and employing the LC 109's identifier as a prefix to numbers generated by an incrementing counter in the LC 109.

Input parameters (IPs) 313 are parameters provided by users who create or process PKG 104. The purpose of the parameters is to provide names by which users can recognize PKG 104 and which they can provide to DTCS 225 when they wish to locate a PKG 104. For example, in an ordering process, the parameters might include the name of the customer making the order, the name of his salesman, the sales office location, the order number, and so forth.

AT 321 is an audit trail for PKG 104. In AT 321, PO 345 identifies the originator of PKG 104, CRD 347 is the date of creation of PKG 104, and COMPD 349 is the date of completion of processing of PKG 104. EXEC REC 351, finally, is a representation of the steps already executed on PKG 104 and the result of the execution of the steps. If the step involved a branch, EXEC REC 351 for the step indicates which branch was actually taken; if an error message was returned when a step was executed, the error number for the message is associated with the step in EXEC REC 351. AT 321 is maintained by PRMS 215 and is used by DTCS 225 to determine the present status of PKG 104.

Package directory (PDIR) 337 is a directory of the files in PKG 104. For each file, it specifies the file's title, its type, and its file name. All files belonging to a PKG 104 are kept in a file system library accessible to PPES 211 and PRMS 215 during the visit of a PKG 104 to LC 109, and the file name specifies that system library.

Returning to FIG. 3 and continuing with PINFO 318, route (RT) 315 specifies the LCs 109 to which PRMS 215 is to transfer PKG 104 and the steps to be performed at each LC 109. Within the LC 109, PRMS 215 may perform a step directly by executing a program from APPS 223, or it may perform the step by sending a message to a workstation mailbox associated with a task 216 in LC 109 and waiting for a return message. In many cases, the task 216 will be interactive, i.e., the task 216 will respond to the message by executing a program which displays a screen on UWS 213 and receives input from UWS 213. Data resulting from the operation may then be returned to PRMS 215 for use in determining which step will be executed next. In FIG. 3, CS 317 represents the current step, i.e., the step in RT 315 currently being executed by PRMS 215. Route counter (RC) 319 in PINFO 318 always indicates the location of CS 317, and is consequently updated at the end of execution of each step to point to the next step in RT 315. In a preferred embodiment, certain recipients of PKG 104 may have access to RT 315. Using a route editor component of PPES 211, such recipients may alter that portion of RT 315 which has not yet been executed.

Figure 6:
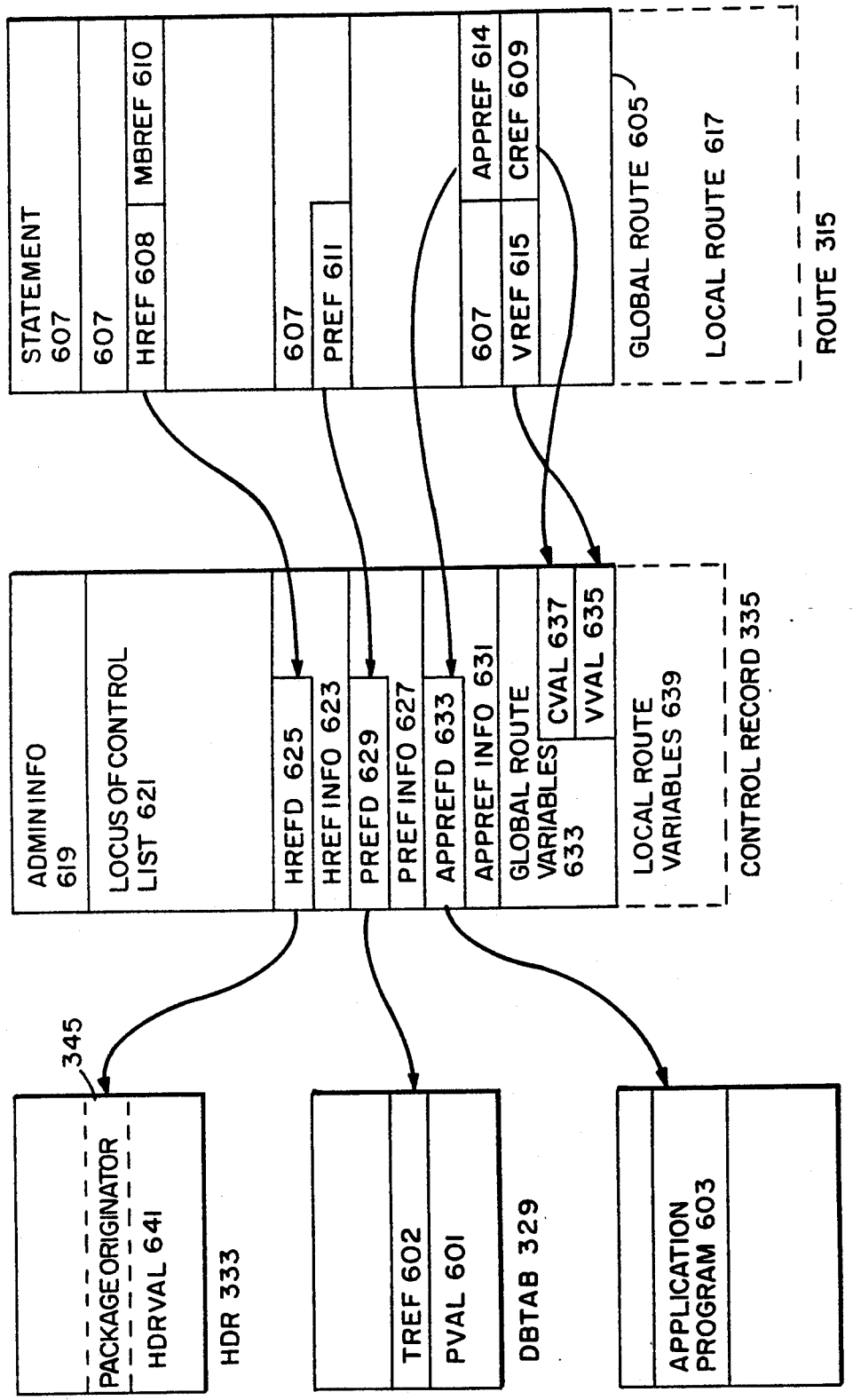
FIG. 6 is a detail of processing information 318.

4. Detail of Processing Information (PINFO) 318: FIG. 6

FIG. 6 is a diagram of PINFO 318, the portion of processing descriptor 105 which specified how PRMS 215 in each specified LC 109 is to process PKG 104. PINFO 318 has at least the following components: RT 315 and control record (CTLREC) 335. RT 315 always includes at least global route (GRT) 605, a portion of RT 315 which accompanies PKG 104 to every LC 109 which will process it and consequently specifies the processing of PKG 104 at the highest level. Additionally, one or more local routes (LRT) 617 may be executed from GRT 605 or another LRT 617 in a LC 109.

GRT 605 and any LRT 617 consist of a sequence of statements 607. The statements are sequences of ASCII characters which are interpreted by PRMS 215. The statements may include references to data and to programs in APPS 223. There are five kinds of references: constant references (CREF) 609, which refer to values which remain constant for every execution of a route, variable references (VREF) 615, which refer to values which may change during execution of a route, package references (PREF) 611, which are read-only references to data fields in one or more of the PDFs 301 making up data 103 in PKG 104, header references (HREF 608), which are references using predefined names to fields in HDR 333, application program references (APPREF) 614, which are references invoking application programs in APPS 223, and mail box references (MBREF) 610, which refer to mailboxes in the electronic mail system.

The data referred to by CREFs 609 and VREFs 615 is contained in locations in CTLREC 335. If the CREFs 609 and VREFs 615 are in GRT 605, the values are in GRTVARS 633. If an execution of a LRT 617 requires its own local storage for variables, that storage in LRTVARS 639. Thus, as shown in FIG. 6, GRTVARS 633 contains CVAL 637, represented by CREF 609, and VVAL 635, represented by VREF 615. For the other reference types, CTLREC 335 contains descriptors which permit location of the values represented by the references in HDR 333, PDFs 301, or APPs 223. Thus, header reference info (HREFINFO) 623 contains header reference descriptors (HREFD) 625 permitting location of header values (HDRVAL) 641 in HDR 333 such as PO field 345. Similarly, package reference information (PREFINFO) 627 contains package reference descriptors (PREFD) 629 permitting locations of package values (PVALs) 601 such as table reference (TREF) 602 in DBTAB 309 and application program reference info (APPREFINFO) 631 contains application reference descriptors (APPREFDs) 633 by means of which PRMS 215 can invoke application programs (APPRS) 603 in APPS 223. The reference information is placed in CTLREC 335 by PPES 211 when a PKG 104 is created or RT 315 is altered.

The remainder of CTLREC 335 contains administration information (ADMININFO) 619 and locus of control list (LCLIST) 621. ADMININFO 619 includes an identification of the central administrator for the type of PKG 104 represented by the package, the name of LOG 331, and in embodiments in which DTCS 225 has a single central CTLDB 227 instead of a hierarchy, the name of LC 109 where CTLDB 227 resides.

LCLIST 621 contains a list of all of the LCs 109 in which an environment for this particular package type is maintained. The entry for each LC 109 in the list further identifies the local package administrator for packages of that type on the given LC 109. When a recipient of PKG 104 modifies RT 315, PPES 211 uses LCLIST 621 to make sure that the modified RT 315 does not send PKG 104 to a LC 109 which has no environment for that type of package. Similarly, PPES 211 uses CTLREC 335 to check the correctness of references in the modified RT 315. Both ADMININFO 619 and LCLIST 621 are placed in CTLREC 335 when PKG 104 is created.

5. Operation of Apparatus 101 in a General Embodiment

Having thus described the components of apparatus 101 and their relationships with each other, a description of the operation of apparatus 101, beginning with definition of a package type in apparatus 101 and continuing with use of apparatus 101 to process the package is provided next. In a preferred embodiment, users of apparatus 101 select package operations from a package menu.

A user who wishes to define a package type and is permitted to do so may select package type definition from the menu. Definition of a package type involves defining a prototype (PTYP) 207 for components of PKGs 104 of the type and defining type environment (TEVN) 353. PTYP 207 contains information which is valid for all PKGs 104 created using PTYP 207. For example, PTYP 207 for HDR 333 might contain SYSNO 339, HDRV 341, PT 311, PTV 343, and the file type description portion of PDIR 337. The amount of information contained in PTYP 207 will vary with the degree of flexibility permitted the type. For example, if all PKGs 104 of the type always use the same RT 315, PTYP 207 may contain the complete RT 315. Defining TENV 353 involves making the materials belonging to TENV 353, and providing them to the LCs 109 processing the package.

Next, a user of apparatus 101 who wishes to create a PKG 104, selects the package creation option on the menu. The next menu presents the package creator with an index of package types. The creator selects the package type corresponding to the business process he wishes to carry out, and PPES 211 selects PTYPE 207 for the type from PTL 205. Using screens defined in PTYPE 207, PPES 211 collects additional information from the package creator as required for the package 104. For all packages, some information, such as an identification of the originator of the package, is required for HDR 333. As explained above, the screens may further request the creator to specify files to be copied into PDFs 301 or to provide data from which a PDF 301 can be made. As PDFs 301 are added to PKG 104, their title, type, and file name are placed in PDIR 337.

Additionally, PPES 211 may permit the creator to provide information from which PPES 211 can modify route 315. For example, the prototype of route 315 as created during package type definition may specify a default list of recipients, PPES 211 may present a screen to the creator permitting him to select recipients from the default list or add recipients to the list, and PPES 211 will then use the information to produce route 315 from a prototype thereof. In carrying out manipulations on the contents of PKG 104, PPES211 uses programs in TOOLS 208 as required by the type of file being manipulated. Type information needed to select the proper program comes from PDIR 337.

At the end of the creation process, data 103 contains all the PDFs 301 needed to commence processing and PD 105 contains RT 315, HDR 333, and CTLREC 335 which are sufficiently complete to begin processing. The creator then indicates to PPES 211 by means of a function key or the like in UWS 213 that the PKG 104 is to be sent. PPES 211 receives PKGID 305 from DTCS 225 and places it in HDR 333. DTCS 225 makes a record for PKG 104 in local CTLDB 227, by filling in a time of arrival field and a package key 303 and sends a message to any related group of DTCS 225 indicating PKG 104's PKGID 305 and location. Since there is no record for PKG 104 in the control library group of the group of DTCS 225, a DTCS 225 of the group sends a message regarding PKG 104's existence and location to a central DTCS 225 coupling groups of DTCS's. Those DTCSs then make records for PKG 104 in those data bases (group control library and central control library). After sending the messages, the local DTCS 225 then confirms that PKG 104 has been registered and PPES 211 sends a message to PRMS 215 indicating that PKG 104 is ready.

PRMS 215 performs whatever processing is specified in RT 315 for the LC 109 where PKG 104 was created, using items in TENV 353 for the package's type as required. Results of the processing are recorded in EXEC REC 351 of HDR 333 and in the record of the PKG 104 in local CTLDB 227. Before sending PKG 104 on to the next LC 109 specified in RT 315, PRMS 215 checks with DTCS 225 for control commands for PKG 104. If there are any, PRMS 215 executes the control commands; if there are none, DTCS 225 indicates that fact and PRMS 215 uses the mail system to send PKG 104 on to the locus LC 109 specified in RT 315. PRMS 215 notifies DTCS 225 that PKG 104 has been sent and indicates the destination; thereupon, PRMS 215 destroys PKG 104 in PKGLIB 210 on that LC 109. DTCS 225 fills in a time of departure field and a destination field in the PKG 104 record of local CTLDB 227, and waits for confirmation from DTCS 225 on the next LC 109 that PKG 104 has arrived.

When PKG 104 arrives in the next LC 109, PRMS 215 in that LC 109 responds to its arrival by copying the contents of PKG 104 into PKGLIB 210 and providing PKGKEY 303 and the mailbox from which PKG 104 was sent to DTCS 225. DTCS 225 makes a VREC 407 for PKG 104, sends confirmation of its arrival to DTCS 225 at the previous LC 109, and sends a message to the related group of DTCS 225 to indicate which LC 109 PKG 104 is presently at. Again, if there is no previous record for PKG 104 in the group control library, a DTCS 225 of that group sends a message to the central DTCS 225.

Once these matters are taken care of, PRMS 215 sends a message to the mailbox specified in the TO statement which sent PKG 104 to LC 109. The message indicates that a PKG 104 has arrived. If the owner of the mailbox wishes to respond to the message, he invokes PPES 211, which uses the contents of PKG 104 and of TENV 353 to provide screens in the fashion described for PKG 104 creation on UWS 213 which guide the owner of the mailbox through the interactive processing which is necessary at that point.

Processing may involve manipulation of PDFs 301, addition of copies of files to PKG 104, or creation of new files therein, as determined by TENV 353 and the access privileges which the owner of the mailbox has with regard to the package contents. Actual manipulation is performed by programs in TOOLS 208 as required for the type of file in PKG 104 being worked on. Using techniques well known in the art, the mailbox owner may provide that processing may be done in the background instead of interactively. Thereupon, the further steps specified for LC 109 in RT 315 are carried out and recorded as required in the package record of local CTLDB 227 and AT 321. If a BACKUP statement is executed at LC 109, making a backup PKG 219, the location of PKGB 219 is indicated in a package block field in the package record in CTLDB 227.

If editing of RT 315 is required, the owner of the mailbox may perform the editing within the bounds permitted by his access privileges and TPTYP 363 of TENV 353. Editing is done using tools of PPES 211 as described for creation of RT 315. The tools may check for consistency of the new material with CTLREC 335. Editing may range from complete access to RT 315 itself to selecting among several local RTs 617 to selecting among different lists of recipients.

Processing continues as described above at each of the LCs 109 specified in RT 315 until all steps have been executed, until a TERMINATE statement is executed, or until a control command is received. Control commands may be issued by any user of apparatus 101 who is privileged to do so. To issue a control command, a user selects that option from apparatus 101's menu. In response to the option, PPES 211 provides menus for the control command. When the user has employed the menus to specify at least PKG 104 and the control command, PPES 211 provides the command to DTCS 225 on the local LC 109. The local DTCS 225 and the DTCSs 225 for the other portions of CTLDB 227 then cooperate as previously described to locate LC 109 currently being visited by PKG 104 and provide the control command to DTCS 225 on that LC 109. DTCS 225 places the command in a control message field of the package record in CTLDB 227. PRMS 215 checks with the local DTCS 225 before sending PKG 104 to the next LC 109, and if one is present, PRMS 215 executes the control command.

Using PPES 211, a user of apparatus 101 may make inquiries of DTCS 225 concerning the current status of a PKG 104. As previously explained, if PKG 104 is currently on the user's LC 109, DTCS 225 obtains the information from the package record in the local CTLDB 227; otherwise, it uses CTLDB 227 to locate PKG 104 and then receives the status information from local CTLDB 227 in that LC 109. If a user receives an error message from ENRS 229, finally, the user may use PPES 211 to examine the message, determine the present status of PKG 104, examine PKG 104, and if necessary, issue the control commands required to correct the situation to DTCS 225.

6. Details of Preferred Embodiment of the Present Invention

The present invention provides loci of control 109 specifically at an origination point, before entering a recipient's mailbox, in a recipient's mailbox, at exit of a recipient's mailbox and at a final stopping point after the last desired recipient (completion point). At the foregoing loci of control 109, the present invention also provides automatic triggering of processing of the package data as specified by the package descriptor 105. Processing may include execution of a certain pre-existing application 223. The present invention includes interface means to pass control between the PRMS 215 and a pre-existing application 223 such that apparatus 101 is customized and retrofit to different pre-established processing systems as will become apparent in the following discussion.

In addition, at each LC 109 of the present invention, certain data is hidden or viewable as dictated by the type of the process package 104. This is accomplished by the present invention using prototypes 207 which specify the viewability aspect of data.

Further, at each LC 109 in the present invention, editing of the process package 104 may be accomplished in multiple sessions without losing added information at the close of each session. This is accomplished by update and recovery means which writes to the package data file 103 as a recipient-user is editing the package 104.

The foregoing features of the present invention are accomplished by the following modifications or additions to the apparatus 101 as described in the parent application Ser. No. 944,500 and summarized above.

In the preferred embodiment of the present invention a process package 104 is formed in package library 210 through PPES 211 interacting with the package originator-user. Process package 104 is formed of a processing descriptor 105 and data 103 (FIGS. 3-3b). The originator-user specifies a desired package type which corresponds to a prototype 207 in prototype library 205. PPES 211 sets package type 311 (FIG. 3a) in the processing descriptor 105 of the package 104 being created to indicate prototype 207 specified by the originator-user. Prototype 207 in turn indicates files which are to be considered part of package 104. Subsequently, during processing of package 104 at origination LC 109, CTLDB 227 of the LC 109 provides an indication of prototype 207 corresponding to package type 311 of the package 104. Using the indication of prototype 207, PRMS 215 includes files of that prototype as listed in local prototype library 205 in any local processing of the package 104. To that end, the files indicated in originator chosen prototype 207 are loaded and hence automatically included in package 104 during origination processing.

Also during creation of a package 104, PPES 211 obtains preprogrammed specifications of which data 103 (automatically included or otherwise included) are to be viewable to recipients and which are to be hidden from recipients although included in the processing of package 104. According to preprogrammed specification, PPES 211 sets a flag 302 or other indicator for each file in the package data 103 to indicate which files are viewable to recipients and which are hidden. Preferably, the flag 302 indicates a file type and is located in a header of each data file 301 (FIG. 3). File types in a predetermined range (for example 300-500) are employed for hidden files, and file types outside of the range are employed for viewable files.

Creation of the package 104 is also supported by preprogrammed specifications which indicate particular applications 223 to be invoked at respective recipient LCs 109 and environment in which each specified application 223 is to be run at the recipient LC 109. That is, the application 223 may be run automatically upon LC 109 receipt of the package 104 or alternatively upon manual command from the user of the receiving LC 109. In the latter case, a menu selection or activation of a function key provide the manual command. With such preprogrammed specifications, PPES 211 provides this processing information at RT 315 of processing descriptor 105 (FIG. 3) of the package 104 which in turn is written to CTLDB 227 of the corresponding recipient LC 109 as described next.

At completion of the formation of the package 104, the CTLDB 227 of the different LCs 109 of a system or network contains entries of the newly formed package 104 as described previously. In the preferred embodiment of the present invention, LCs 109 of one system share a common CTLDB 227 of that system. And LCs 109 of other systems refer to CTLDB 227 of the respective system. PRMS 215 of the different systems pass information of newly formed packages 104 to form corresponding entries in respective CTLDBs 227. For each newly formed package 104, the information passed includes the PKG ID 305 (FIG. 3a) of the package as assigned by the DTCS 225 of the LC 109 of the originator, the package type 311 which cross-references in a local prototype library 205 the automatically included files of package 104, and the processing to be invoked at the local LCs 109.

Specifically, an entry into CTLDB 227 for a package 104, provides a pointer to the user specified application 223 in RT 315 of the package 104 which is to be run to process the package 104 at a designated LC 109. If the LC 109 is the origination point or the point at which the package is inside a user's electronic mailbox, the application 223 is run attached to UWS 213 or interactively with the user of the LC 109 through the workstation 213. If the LC 109 is on entry to or exit from a user's electronic mailbox or at a completion point then the application 223 is run non-interactively, i.e. unattached or decoupled from UWS 213.

After package 104 has been registered with the DTCSs 225 of recipient LCs 109 (i.e. entered into CTLDBs 227 with corresponding package type and pointer to desired applications 223), PPES 211 sends a message to PRMS 215 of LC 109 at which package 104 was created. PRMS 215 performs whatever processing is specified in RT 315 for origination LC 109 and includes running any application 223 specified by the user for the origination locus of control. This is accomplished by PRMS 215 calling DTCS 225 to look into local CTLDB 227 under the PKG ID 305 for package 104. If the entry for package 104 provides, for local processing, a pointer to an application 223, then PRMS 215 runs that application 223 automatically or upon user command as specified in RT 315 of package 104. In many cases data resulting from execution of application 223 is added to data 103 of package 104. Other results and/or status of the processing are recorded in EXEC REC 351 of HDR 333 (FIG. 3a) and in pertinent records of CTLDB 227 as described previously.

Upon completion of processing at origination LC 109, PRMS 215 uses the mail system to send package 104 on to the next LC 109 specified in RT 315. If the next LC 109 is an entry point to a recipient's mailbox, then the PRMS 215 of the workstation 213 of the recipient handles the package 104 as follows. That PRMS 215 places the package 104 into a holding folder 420c of the mailbox file 400 (described later) of the workstation 213 of the recipient. With package 104 in holding folder 420c, the local PRMS 215 does not notify the workstation user of package 104's existence. Instead, the PRMS 215 performs whatever processing is specified in RT 315 for the LC 109 now in receipt of package 104 (i.e. the locus of control on entry to the workstation user's mailbox). This includes running any preprogrammed specified application 223 pointed to by the local CTLDB 227. PRMS 215 calls the local DTCS 225 to look into CTLDB 227 under the PKG ID 305 of package 104. If the CTLDB 227 entry for package 104 provides a pointer to application 223 for current local processing according to the package originator, then PRMS 215 runs that application 223 automatically and non-interactively since the package 104 is outside of the local user's mailbox and hence, outside of user's local memory.

Results of application 223 are recorded in EXEC REC 351 of package HDR 333 and generated data is added to package data 103. To that end, such automatic, non-interactive, pre-mailbox delivery processing of package 104 serves preparatory purposes. For example, various formatting of package data, or retrieval of images for the package 104 and the like is accomplished by execution of application 223 on entry to a recipient's mailbox such that the form of package 104 subsequently received by the recipient is readily usable by him. Thus, processing on entry to a recipient's mailbox minimizes preparatory processing during recipient's time of possession of the package 104 and allows the recipient to concentrate on his evaluation and processing of package 104.

Upon completion of processing at mailbox entry LC 109, PRMS 215 moves package 104 from the holding folder 420c of mailbox file (MBF) 400 to the mailbox folder 420a which references mail item section 411 of MBF 400 (described later). This effectively passes package 104 to the next LC 109 in RT 315. PRMS 215 then performs whatever processing is specified in RT 315 for that LC 109 (i.e. the in-mailbox processing point). This includes running any preprogrammed specified application 223 pointed to by the local CTLDB 227 and running the application interactively attached to UWS 213 or non-interactively unattached to UWS 213, and upon user command at LC 109 or automatically upon user selection of the package from mailbox LC 109, as specified for the PKG 104 in CTLDB 227.

Specifically, PRMS 215 calls the local DTCS 225 to look into CTLDB 227 under the PKG ID 305 of package 104. If the CTLDB 227 entry for package 104 provides a pointer to application 223 for current processing, then PRMS 215 runs that application as specified. Results of application 223 are recorded in EXEC REC 351 of package HDR 333 and generated data is added to package data 103.

Upon completion of in-mailbox processing at LC 109, PRMS 215 uses the mail system to send package 104 onto the next LC 109 specified in RT 315. However, if the next LC 109 is the exit point of the mailbox in which the package 104 was just processed, then PRMS 215 moves package 104 from mailbox folder 420a to the holding folder 420c. In holding folder 420c, package 104 is not within the local memory of the user of the mailbox and, hence, is outside of his access. PRMS 215 performs whatever processing is specified in RT 315 for LC 109 now in receipt of package 104 (i.e. the LC on exit from the workstation user's mailbox). In particular, processing is similar to that described previously for mailbox entry LC 109.

Upon completion of mailbox exit processing at LC 109, PRMS 215 uses the mail system to send package 104 to the next LC 109 specified in RT 315, and so forth. That next LC 109 may be a mailbox entry or an in-mailbox processing point. That is, the plurality of LCs 109 in RT 315 may be any combination of mailbox entry, in-mailbox and mailbox exit processing points. After a last LC 109, PRMS 215 uses the mail system to send package 104 to a completion processing point if indicated in CTLDB 227. The completion processing point is preferably the PKGLIB 210 of a predetermined workstation 213. The PRMS 215 of that workstation runs in background to finally process the package 104. This includes writing to a database pertinent information from the package data and the like. Again PRMS 215 looks to RT 315 and CTLDB 227 for specified processing of package 104 at the completion LC 10 as previously described for the other processing points.

Figure 4:
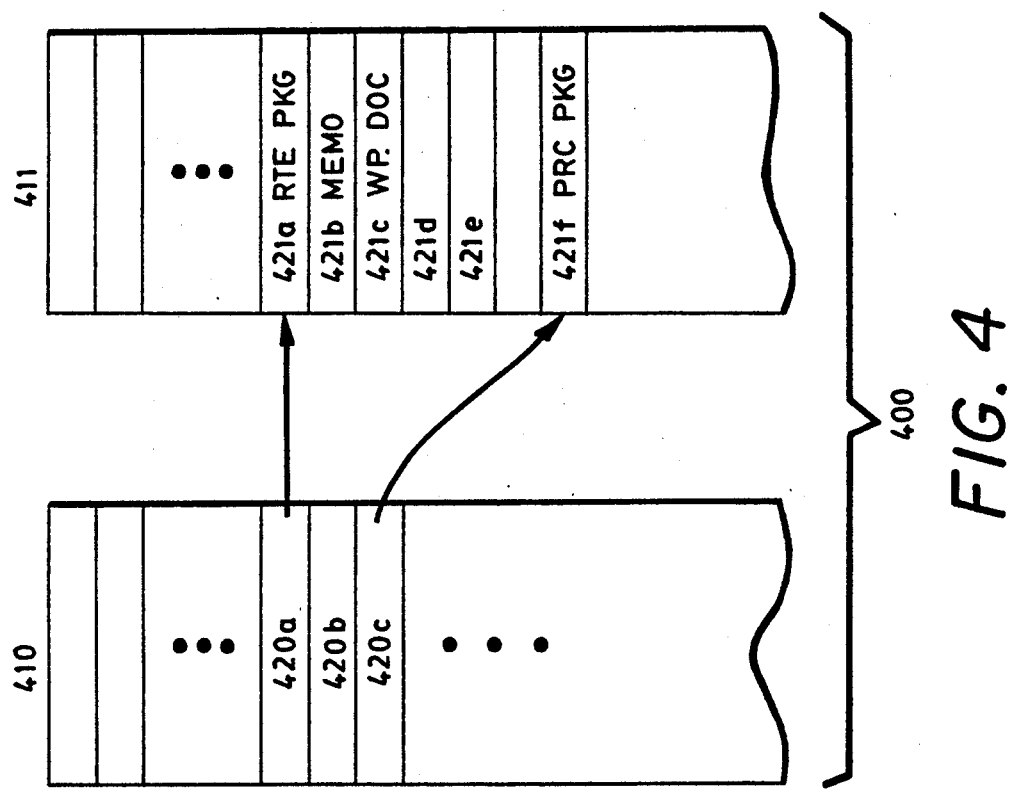
FIG. 4 is a diagram of mailbox file 400 of an electronic mailbox at a locus of control.

FIG. 4 illustrates the preferred structure of MBF 400 which includes a folders section (FS) 410 and a mail items section (MI) 411. Various items may be placed in separate records 420a..n of the folders section 410, and the owner of the workstation 213 mailbox supported by MBF 400 is alerted to the existence of the items according to record 420 holding the item. Generally, FS 410 holding folder or record 420c is for temporary holding of the items while allowing general system access to the items using the memory location of record 420c as an access address. FS 410 record 420a is the mailbox folder which provides pointers to items in the workstation users mailbox.

MI 411 of MBF 400 holds in respective records 421 the various items which are referenced by folder records 420 and are accessible by the mailbox owner through local memory according to folder record 420 referencing the item. Specifically, the items pointed to by the mailbox folder 420a are the "delivered" mail items of a user workstation 213. Unlike with the items pointed to by holding folder 420c, the mailbox owner is alerted of the existence of the items pointed to by mailbox folder 420a. Preferably, the mailbox owner is alerted of the type of item in each MI record 421 pointed to by mailbox folder record 420a as well as the existence thereof.

In the case of the process package 104, upon PRMS 215 moving the package 104 from a holding folder record 420c to a mailbox folder record 420a, the process package type is indicated through the workstation 213 to inform the recipient that he has received in his mailbox a process package 104 as distinguished from a circulatory route package, an electronic mail message, or any other piece of mail. Upon the recipient selecting from a menu or otherwise selecting process package 104 now existing in his mailbox for local access thereto, local PRMS 215 performs the processing specified in RT 315 for the current LC 109.

In the preferred embodiment, local PRMS 215 calls local DTCS 225 to look into local CTLDB 227 under the PKG ID 305 of the received process package 104. If the CTLDB 227 entry for the package 104 provides a pointer to application 223 for current processing as desired by the originator of the package, then PRMS 215 runs that application 223. The application 223 is run in a task attached to UWS 213 or in a task unattached to UWS 213, and automatically upon recipient selection of the process package 104 or upon recipient command, as specified by the package type and recorded in CTLDB 227.

To that end, a pre-existing application 223 known to the recipient may be invoked for processing the package 104 while in his possession. As a result, the local processing appears to the recipient as it previously did before installation of apparatus 101 on his workstation 213 when he invoked application 223 to run on received data. Thus, the recipient does not have to learn a new processing environment or new commands to process package 104 using apparatus 101.

Similarly, pre-existing applications 223 may be invoked for processing at origination point LC's 109, mailbox entry LC's 109, mailbox exit LC's 109, and/or completion LCs 109.

Exit section 408 of MBF 400 holds in respective records 409 various items moved out of workstation 213 mailbox and, hence, moved out of MI 411. The owner of the workstation 213 mailbox supported by MBF 400 is not alerted to the existence of the items in exit section 408. Generally, exit section 408 is like FS 410 and is for holding items outside of mailbox user local memory while allowing general system access with memory location of records 409 as an access address.

Figure 5:
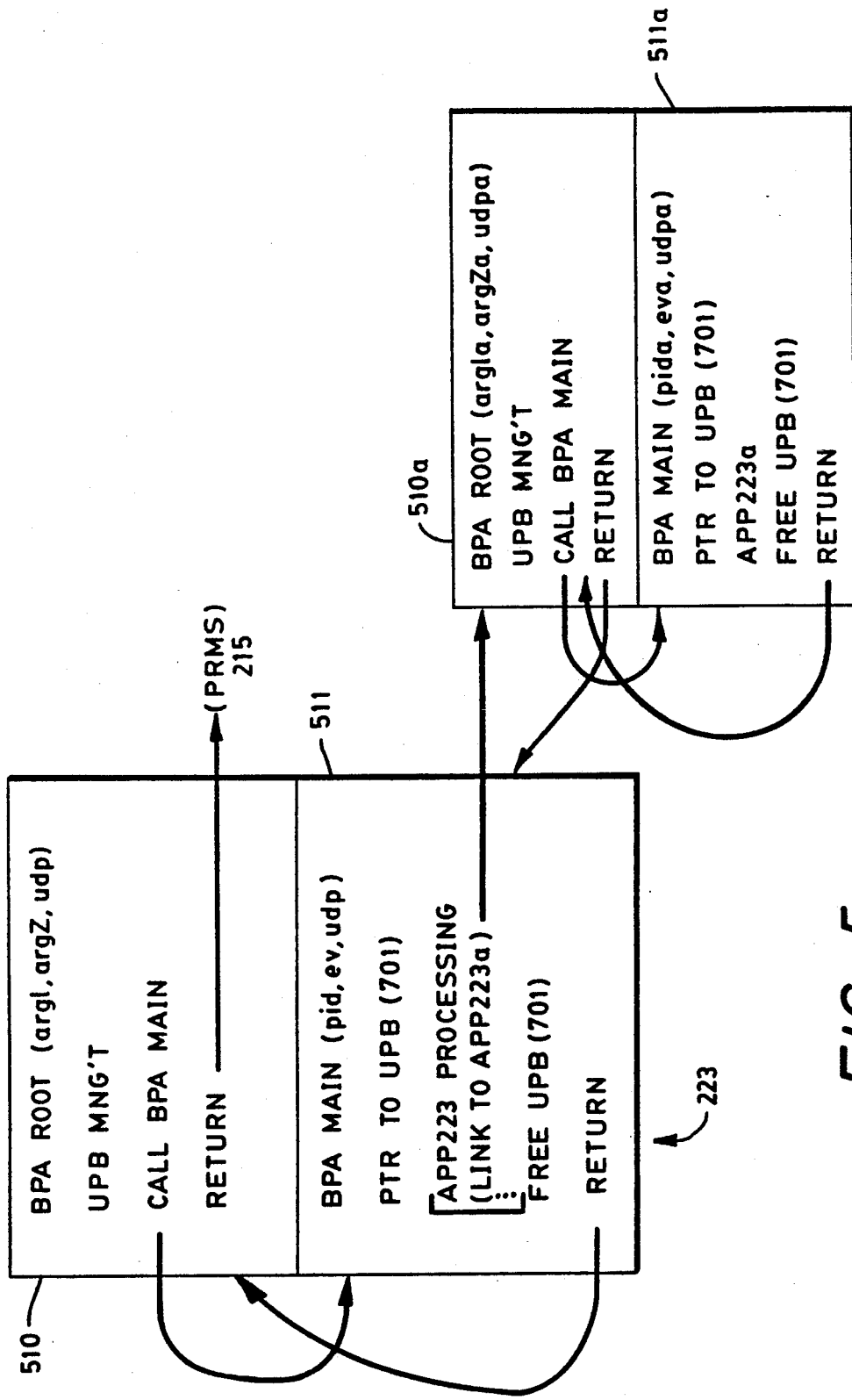
FIG. 5 is a diagram of processing interface to a pre-existing application for processing package 104 therewith.

In the case of a pre-existing application 223 desired to be invoked for local processing at LC 109, the present invention employs an application 223 structure illustrated in FIG. 5. The package 104 entry in local CTLDB 227 provides a pointer to BPA Root 510 of application 223. PRMS 215 calls BPA Root 510 with input arguments from CTLDB 227 for the package 104.

For pre-existing applications 223 submitted from background at entry, exit or completion LCs 109 (and therefore non-interactively run) the input arguments are:

(i) arg 1—a character pointer to the local PKG ID of package 104;

(ii) arg 2—a character pointer to a character identifying the invoking LC 109 referred to as the current event. The valid values for the text pointer and hence event value are E, X and C for entry, exit and completion respectively; and (iii) udp—the address of the data block of the user of local workstation 213 which may be passed into BPA Root from a higher level. This is an optional argument. Predefined conventions are used to determine the number of passed arguments.

For pre-existing applications 223 invoked at origination or in mailbox LC's 109 (i.e. in foreground or interactively run), the input arguments are:

(i) arg 1—a character pointer to a universal parameter block (UPB 701) for the package 104 at the current LC 109 as described later. If the LC 109 is an origination processing point, then zeroes are used;

(ii) arg 2—a character pointer to a character indicating invoking LC 109 referred to as the current event. The valid values for the text pointer and thus, event values are O and I for origination and in mailbox, respectively.

(iii) udp—the address of the data block of the user of local workstation 213 which may be passed into BPA Root from a higher level. This is an optional argument.

From the local PKG ID (arg 1) and character identifying current event (arg 2), BPA Root 510 establishes a UPB 701 for current LC 109 processing of the package 104 if PRMS 215 hasn't already done so (as in the case of in-mailbox processing). To accomplish this, BPA Root 510 (PRMS 215) calls a BPAUPB routine which dynamically allocates memory needed for the specific processing point (LC 109). All memory allocated for a specific UPB comes from a unique named sub-pool. The unique sub-pool name is created using the following format:

TTTmssth where TTT is the task number (000–999);
m is the units minute value;
ss is the seconds;
t is tenths of a second; and
h is hundredths of a second.

Up to 16 UPBs can be allocated at one time (which means 16 unique-named sub-pools). For all practical purposes, this means that one received process package (mail item) and 15 process packages being originated simultaneously; or 16 process packages being originated simultaneously are being supported.

The form of the UPB 701 is described next. The UPB 701 is an in-memory data structure which serves as a status block of a package 104 for processing at an LC 109. In particular, the UPB 701 holds parameters used by interactive applications 223 invoked at an LC 109 for processing the package 104 and which are available for subsequent use by interactive applications 223 invoked at the LC 109 for the package 104. A different UPB 701 for a package 104 is formed at each LC 109 which invokes applications 223 for processing the package 104.

The UPB 701 of an LC 109 may have different pointers to it. An initial pointer is used for running of a first application 223 at the LC 109 to process the package 104. If the first application 223 calls a nested application 223 then the pointer is re-established for use in the nested application 223, and so forth. Preferably, at each link level (nesting level), the pointer is locally re-established. Also, when a nested application 223 has run to completion, freeing of local access (setting the local pointer to the UPB 701 to nil) is performed before control is returned to the outer level application 223. The un-establishing of the local pointer to the UPB 701 is accomplished at each level of processing upon completion of processing at that level. Preferrably this is accomplished through a BPAFree UPB function.

Figure 7:
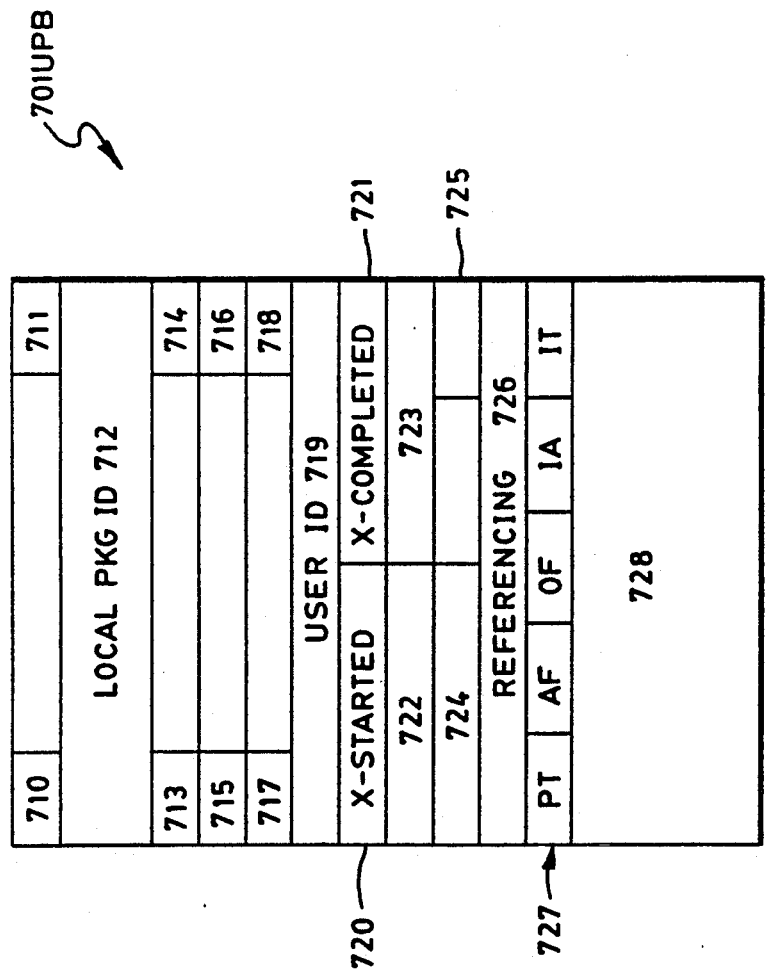
FIG. 7 is a detail of universal parameter block 701.

FIG. 7 illustrates the preferred data structure of a UPB 701 for a package 104 at an LC 109. The fields of UPB 701 are as follows. Field 710 holds a character value indicating the version of the BPAUPB routine used to generate this UPB 701. Field 711 is a character field indicating the invoking LC 109 by its event value. Valid values include O, E, I, X, C for origination, entry, in-box, exit and completion respectively. Application 223 has read access rights to fields 710 and 711.

The local PKG ID of the package 104 is held in field 712. The field is set to zero at origination. Application 223 has read access rights to this field.

Character fields 713 and 714 provide indications of the type of invocation of application 223. In particular, field 713 has a value of "F" or "B" to indicate whether the application is currently running in foreground or background respectively. And field 714 provides values "I" or "A" to indicate whether the current user is an interactive user or an application user. The application 223 has read access rights to these two fields 713 and 714 during processing at any process point (i.e. origination, entry, in-mailbox, exit and completion).

Field 715 provides a character indication of "A" to indicate that the package 104 is active or "C" to indicate that the package has completed processing. Application 223 has read access rights to field 715 during processing at all but origination points (LC's 109).

Field 716 is a character field providing an indication of "Y" to enable or "N" to disable further processing of the package at UWS 213. Field 716 is not accessible by application 223 during processing at entry, in-mailbox, exit and completion points LC 109.

Field 717 is a character field indicating the key or index to a particular record in the package definition in CTLDB 227 for PKG 104. Application 223 has read only rights to field 717.

Field 718 is a character field indicating the key to the record in the mailbox file 400. Application 223 has no access rights to field 718.

Field 719 is a character field providing the network or global identification of the user of the workstation 213. Application 223 has read only rights to field 719.

Field 720 provides the number of times application 223 has been started for the current processing point (LC 109). Application 223 has read only access to this field.

Field 721 provides an indication of the number of times application 223 was completed for the current processing point (LC 109). Application 223 has read only rights to this field 721.

Field 722 provides the previous return code if field 721 does not hold a value of zero. Application 223 has read only rights to field 722.

Field 723 provides the program return code 0, 16 or 32 for application 223 to UT 212 for processing of UWS 213. Application 223 has read and write access to field 723.

Field 724 provides the destination folder record 420 in mailbox file 400. Application 223 has read and write access to field 724 during entry to mailbox and completion processing points (LC 109).

Field 725 is a character field holding the sub-pool name from which memory was allocated for UPB 701. Application 223 has no access to field 725.

Field 726 provides various reference information in character format from the package definition in CTLDB 227. Application 223 has read only access to field 726.

Field 727 provides five pointers. A first pointer points to package data file 103 (FIG. 3) which lists the data in package 104. Application 223 has read only access to this pointer during origination and in-mailbox processing. A second pointer points to the flags of the files automatically included by the prototype 207 of package 104. Application 223 has read only access to this pointer during origination processing. A third pointer points to origination fields. Application 223 has read only access to this pointer during origination processing. A fourth pointer points to interactive information for application 223. Application 223 had read only access to this pointer during origination and in-mailbox processing. The fifth pointer points to a table of recipients for parallel distribution of the PKG 104 in alternative to process routing the package. Application 223 has read only access to this field during origination processing.

Field 728 is used to hold pertinent additional information. This includes interactive information for origination and in-mailbox processing pointed to by the third and fourth pointers of field 727. Also default information and/or status information of package files for origination processing may be held in field 728.

Returning to FIG. 5, BPA Root 510 determines from the input arguments used to call it whether the pre-existing application 223 is being run attached to UWS 213 (interactively) or not attached to UWS 213 (non-interactively) and calls BPA Main 511 which is the entry point within the desired pre-existing application 223. BPA Root does whatever is necessary to normalize any differences between the interactive and non-interactive environments. BPA Root 510 calls BPA Main 511 with three input parameters which are defined in and added into the program of pre-existing application 223 as part of conforming application 223 to apparatus 101. The three input parameters are:

pid—an unsigned 32 bit integer which is the local package identification of package 104;

ev—a single character which identifies the invoking LC 109. Valid values for ev are O, E, I, X and C for origination, mailbox entry, in-mailbox, mailbox exit and completion of package route, respectively;

udp—an optional pointer to a user (APP 223) defined data structure, e.g. the data block of the user of the local workstation 213. This parameter is always null (zeros) if BPA Root 510 did not receive this parameter. The high bit is set to indicate that this is the last parameter in accordance with predefined convention.

BPA Root 510 defines the three input parameters to BPA Main 511 from information passed in through workstation 213 during user interaction or from information passed by PRMS 215 into pre-existing application 223.

After being called, BPA Main 511 establishes a local pointer to the UPB 701 of the package 104 for local processing by pre-existing application 223. To accomplish this, BPA Main 511 calls routine BPAUPB with input parameters pid and ev. From these parameters the routine BPAUPB defines a local pointer to the UPB 701 and if necessary allocates any additional memory required by the UPB 701 for the current process point (LC 109) as described above.

BPA Main 511 may then call a nested pre-existing application 223a. To do this, BPA Main 511 dynamically links to the nested application 223a using the same interface of BPA Root 510 and BPA Main 511, passing application defined data structures. This is accomplished through the udp parameter in the BPA Root 510 and BPA Main 511 function definitions.

When dynamically linking to another application 223a, the calling sequence to the subsequent BPA Root 510a is used with the first input argument being the pointer to the UPB 701. The second input argument is the pointer to the event, i.e. character identifying LC 109, and the last input argument is the address of the user defined data structures of workstation 213. If the last input parameter is not included, BPA Root 510 passes a null pointer into BPA Main 511a as a third input parameter into it.

As previously mentioned, upon completion of nested application 223a the pointer to UPB 701 local to that application 223a is set to null. The BPA Root 510a which initiated the inner level of processing returns to the next outer level containing pre-existing application 223 (BPA Main 511). This outer level pre-existing application 223 completes its processing and upon completion the BPA Main 511 of that application frees the UPB 701 used during that level of processing (i.e. sets the local pointer to null). And control is returned to BPA Root 510 which called BPA Main 511. BPA Root 510 returns processing to PRMS 215.

In addition to the foregoing processing of pre-existing application 223, a non-interactive pre-existing application may be designed to run as a server-style task. This allows one task to be dedicated to handling all non-interactive processing for one type of process package 104. This is advisable only if there is enough activity to justify this dedicated task. This is an alternative to always submitting a task for each invoked non-interactive processing point (LC 109).

The server-style task is automatically started "on error" by the PRMS 215 as designated in CTLDB 227 or by DTCS 225 for package 104 according to the package definition set by the preprogrammed package specification. The PRMS 215 first attempts to notify the task.

To notify the task, PRMS 215 passes a five byte message. The first four bytes contain the local identifier of package 104, and the last byte contains the event character. Valid values for the event character are O, E, I, X, C which are origination, entry, in-mailbox, exit, completion points LC 109 respectively.

Upon failure of this notification, the PRMS 215 submits the specified non-interactive program to the background procedure queue. In submitting the non-interactive program, PRMS 215 creates a procedure language file which holds an execution statement to run application 223 with local package identifier and event parameters. With these two pieces of information a UPB 701 is created by the server-style task calling routine BPAUPB as described above.

During processing of package 104, data is written to and deleted from package data 103. The present invention provides a package update and recovery routine which modifies package data 103 during a recipient's editing thereof. In contrast, in systems previous to the present invention, changes to the package data by a recipient are first held in local memory of the recipient's workstation 213. Upon the recipient invoking a send-along function signifying completion of processing of the package at his mailbox (LC 109), the changes from local memory were put into effect to change data 103 on disk.

One disadvantage of holding recipient changes in local memory until execution of the send-along function is that the recipient is limited to making all of his changes within one session. That is, a recipient is not able to provide some of his modifications to the package, change to another task and return to the editing task of the package. This is due to the first set of additions during an initial session being cancelled out or lost in local memory when the other task is invoked by the recipient. The only way to save those additions is for the recipient to invoke the send-along function which in addition to saving the local memory additions executes the mailing of the package onto the next recipient. Hence, the first recipient is unable to return to the package to provide additional changes as desired.

Figure 8:
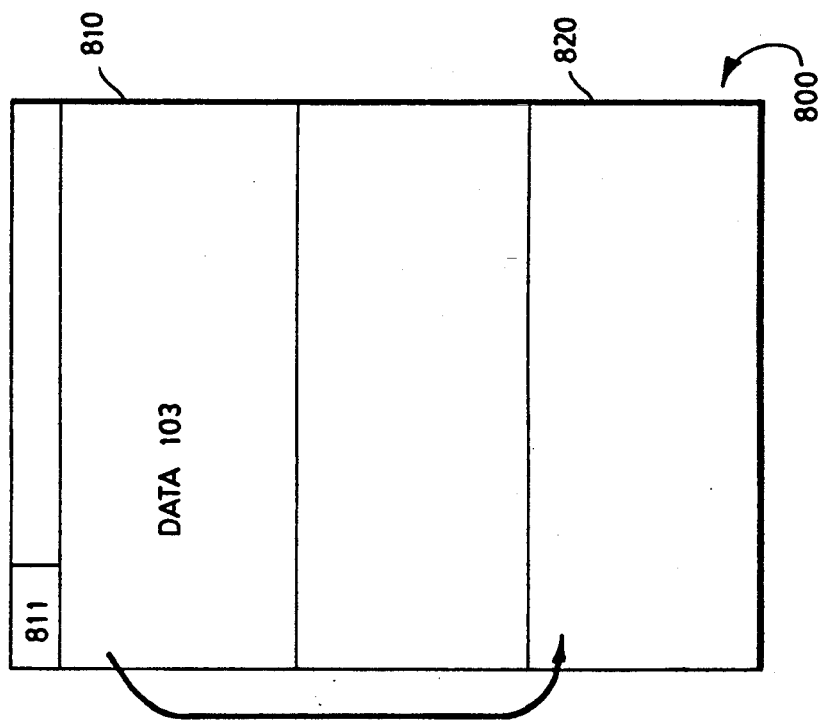
FIG. 8 is a diagram of package data update means in a preferred embodiment.

The package update routine of the present invention operates as follows and illustrated in FIG. 8. Data 103 is held in a memory area arranged according to records. During processing at an LC 109, routine package update copies existing data 103 from a main set of records 810 to a temporary set of holding records 820. The routine then looks at the in-memory (i.e. local memory) image of package data 103 which supports the current view on the display screen of workstation 213 or the noninteractive application currently running, and copies that image into records 810 thus re-writing over initial data 103. Once the re-writing of data 103 from the in-memory image into m in records 810 is completed, then the contents of the records 820 are deleted.

A recovery flag 811 is located in the first record of the memory area 800 and is used to indicate the state of the main data records 810. That is, during execution of the package update routine, recovery flag 811 is set to a "in-use" state such that outside routines are unable to read data 103 in main records 810 at that time. Before execution of the routine and at the end of the routine, recovery flag 811 is set to "normal state" to indicate that other routines may read records 810 to obtain data 103.

In a preferred embodiment, recovery flag 811 has a value of zero to indicate that records 810 are in a normal state. Flag 811 is set to a value of one to indicate that the copy operation is in progress. Recovery flag 811 is set to a value of two to indicate that the updating/re-writing operation is in progress. Recovery flag 811 is set to a value of three to indicate that the delete operation of records 820 is in progress.

The package update routine is performed at an LC 109 where the recipient has added to or deleted from package 104. Preferably, the routine is invoked upon the editing recipient confirming his choice of package additions and deletions. Thus, the updating of data 103 is completed by the time the recipient invokes the send-along function to mail the package 104 to the next recipient.

In the case of a system crash while the memory records 810 are being updated, the present invention provides the following recovery routine called by an inquiring program. The recovery routine begins by reading the first record of data 103 in the set of main records 810. If that record does not exist then an unrecoverable error has occurred and the routine provides to the calling program a message indicating such. Subsequently, a message is displayed on workstation 213 which notifies the user that the recovery operation has failed due to an unrecoverable error, or an error code is returned to the non-interactive application currently running. If the recovery routine finds that the first record in memory area 810 does exist, then the recovery routine checks recovery flag 811. If the value of recovery flag 811 is zero, then records 810 are healthy and operations may proceed as normal.

If the value of recovery flag 811 is one, then the copy operation was in progress when the system crash occurred. The update of the original records 810 has not happened so at least the original data 103 can be used. The recovery routine deletes any copies that may have been made of records 810 and sets the recovery flag 811 to zero. The routine returns to the calling program an error indication that the last update may have been lost and recovery has been done.

When the recovery flag 811 has a value of two, the recovery routine knows that the update operation was in progress. The original records 810 may have been updated or left in an inconsistent state, so they are no longer valid. The routine restores data 103 from records 820 into records 810 and then removes any records no longer needed. The recovery routine sets flag 811 to one after the restore has been completed and then to zero after the extra records have been removed. The recovery routine returns an error indication to the calling program that recovery has been done and the data of the last update before the system crash may have been lost.

If recovery flag 811 has a value of three, the delete operation was in progress at the time of the system crash. The update was completed, therefore the data records 810 are valid so extra records 820 may be deleted. The recovery routine sets flag 811 to zero and returns no error to the calling program.

If the recovery routine finds an unknown value in the recovery flag 811, an unrecoverable error has occurred and the recovery routine returns an error indicating such to the calling program.

While the invention has been particularly shown and described with reference to a preferred embodiment thereof, it will be understood by those skilled in the art that various changes in form and details may be made therein without departing from the spirit and scope of the invention as defined by the appended claims.

We claim:

1. In a digital data processing system having a first plurality of loci of control, apparatus for distributing the processing of data across the loci comprising;
   a package having (i) data to be processed, and (ii) a processing descriptor including an indication of a type of the package independent of the data to be processed;
   means for routing the package to a second plurality of the first plurality of loci according to the type of the package; and
   interpreter means in each locus of the second plurality of loci for processing the data according to the type of the package as indicated by the processing descriptor of the package.

2. Apparatus as claimed in claim 1 wherein:
   the means for routing includes a message system for providing items to a multiplicity of recipient-user electronic mailboxes; and
   the second plurality of loci includes at least one of an origination locus, a mailbox entry locus, an in-mailbox locus, a mailbox exit locus, and a completion locus, the origination locus being a locus at which the package was created, the mailbox entry locus being an entry to a recipient-user electronic mailbox, the in-mailbox locus being an electronic mailbox of a recipient-user, the mailbox exit locus being an exit from a recipient-user electronic mailbox, and the completion locus being a final locus for processing data of the package at the end of routing the package to the second plurality of loci.

3. Apparatus as claimed in claim 1 wherein:
   the processing descriptor further includes indications of certain loci of the second plurality of loci at which processing of the data is to automatically begin upon receipt of the package at the certain loci; and
   the interpreter means in at least each of the certain loci of the second plurality of loci includes control means which begins processing of the data according to the processing descriptor upon receipt of the package at the locus instead of upon a command given to the locus subsequent to arrival of the package.

4. Apparatus as claimed in claim 3 wherein:
   the means for routing includes a message system for providing items to a multiplicity of recipient-user electronic mailboxes; and
   at least one of the certain loci of the second plurality of loci is an electronic mailbox, the control means at the loci beginning processing of the data of the package according to the processing descriptor upon recipient-user of the mailbox selecting the package in the mailbox.

5. Apparatus as claimed in claim 1 wherein the interpreter means includes an interface for calling at least one pre-existing application such that data is processed within said pre-existing application.

6. Apparatus as claimed in claim 1 wherein the processing descriptor further includes indications of viewability of the data at the second plurality of loci such that at each loci of the second plurality of loci certain portions of the data are viewable to a user at that loci and different portions of the data are viewable to a user at different loci of the second plurality of loci.

7. Apparatus as claimed in claim 1 further comprising editing means in each locus of the second plurality of loci for editing the data of the package in multiple sessions.

8. Apparatus as claimed in claim 7 further comprising data update means in each locus of the second plurality of loci for updating the data in the package during editing of the data in each session.

9. In a digital data processing system having a first plurality of loci of control, apparatus for distributing the processing of data across the loci comprising:
   a package having (i) a processing descriptor indicating type of the package and (ii) data to be processed;
   an electronic mail system for routing the package to a second plurality of the first plurality of loci, the second plurality of loci including at least one of an origination locus, a mailbox entry locus, an in-mailbox locus, a mailbox exit locus, and a completion locus at the end of the routing of the package to the second plurality of loci; and
   interpreter means in each locus of the second plurality of loci for processing the data according to the package type including, for certain loci of the second plurality of loci, beginning processing of the data upon receipt of the package at the loci instead of upon command given to the loci subsequent to receipt of the package at the loci.

10. Apparatus as claimed in claim 9 wherein at least one of the certain loci of the second plurality of loci is an electronic mailbox, and the interpreter means at that loci begins processing of the data of the package according to package type upon user of the electronic mailbox selecting the package from the mailbox.

11. Apparatus as claimed in claim 9 wherein at least one of the certain loci of the second plurality of loci is an electronic mailbox, and the interpreter means at that locus includes an interface for calling a pre-existing application to process the data upon user of the electronic mailbox selecting the package in the electronic mailbox.

12. Apparatus as claimed in claim 9 wherein the interpreter means includes an interface for calling a pre-existing application to process the data.

13. In a digital data processing system having a first plurality of loci of control, apparatus for distributing the processing of data across the loci comprising:
   a package having (i) data to be processed and (ii) a processing descriptor indicating package type;
   means for routing the package to a second plurality of the first plurality of loci; and
   interpreter means in each locus of the second plurality of loci for processing the data according to package type indicated by the processing descriptor of the package including calling through an interface a pre-existing application to process the data.

14. Apparatus as claimed in claim 13 wherein at least one of the locus of the second plurality of loci is an electronic mailbox, and upon user of the mailbox selecting the package from the mailbox the interpreter means at that locus through the interface calls a pre-existing application to process the data within the application.

15. In a digital data processing system having a first plurality of loci of control, a method for distributing the processing of data across the loci comprising the steps of:

providing a package having (i) data to be processed and (ii) a processing descriptor indicating package type;

routing the package to a second plurality of the first plurality of loci, the second plurality of loci including at least one of an origination locus, an electronic mailbox entry locus, and electronic mailbox locus, an electronic mailbox exit locus, and a completion locus at the end of routing the package to the second plurality of loci; and at each locus of the second plurality of loci, interpreting the processing descriptor and processing the data according to package type.

16. A method as claimed in claim 15 wherein the step of interpreting and processing at each locus includes processing the data according to the processing descriptor upon receipt of the package at the locus instead of upon a command given to the locus subsequent to receipt of the package at the locus.

17. A method as claimed in claim 15 wherein the step of interpreting and processing includes calling a pre-existing application through an interface to process the data.

18. A method as claimed in claim 15 further comprising the steps of:

editing in multiple sessions the data of the package in certain loci of the second plurality of loci; and updating the data in the package during editing of the data in each session.

* * * * *

UNITED STATES PATENT AND TRADEMARK OFFICE
CERTIFICATE OF CORRECTION

PATENT NO.   :   5,113,393
DATED        :   5/12/92
INVENTOR(S)  :   Kam, Truchon, Goodale, Dalton It is certified that error appears in the above—identified patent and that said Letters Patent is hereby corrected as shown below:

On Line 10 of the Abstract change "focus of control"
    to -- locus of control --.

Column 9, Line 48 change "TI in data base library"
    to -- TI 357 in data base library --.

Column 23, Line 55 change "into m in records 810"
    to -- into main records 810 --.

In the Drawings:
In Figure 2 there should be an arrow leading from Control Database
    227 to Applications 223.

In Figure 3A the area labelled "Creation Date 147" should read
    -- Creation Date 347 --.

In Figure 7 the fourth block of reference line 727 should
    read -- IN -- instead of "IA".

Signed and Sealed this

Twelfth Day of October, 1993

BRUCE LEHMAN

*Attest:*

*Attesting Officer*        *Commissioner of Patents and Trademarks*